Jan. 6, 1953 H. L. BROCK 2,624,257
FARM TRACTOR
Filed July 28, 1948 2 SHEETS—SHEET 1
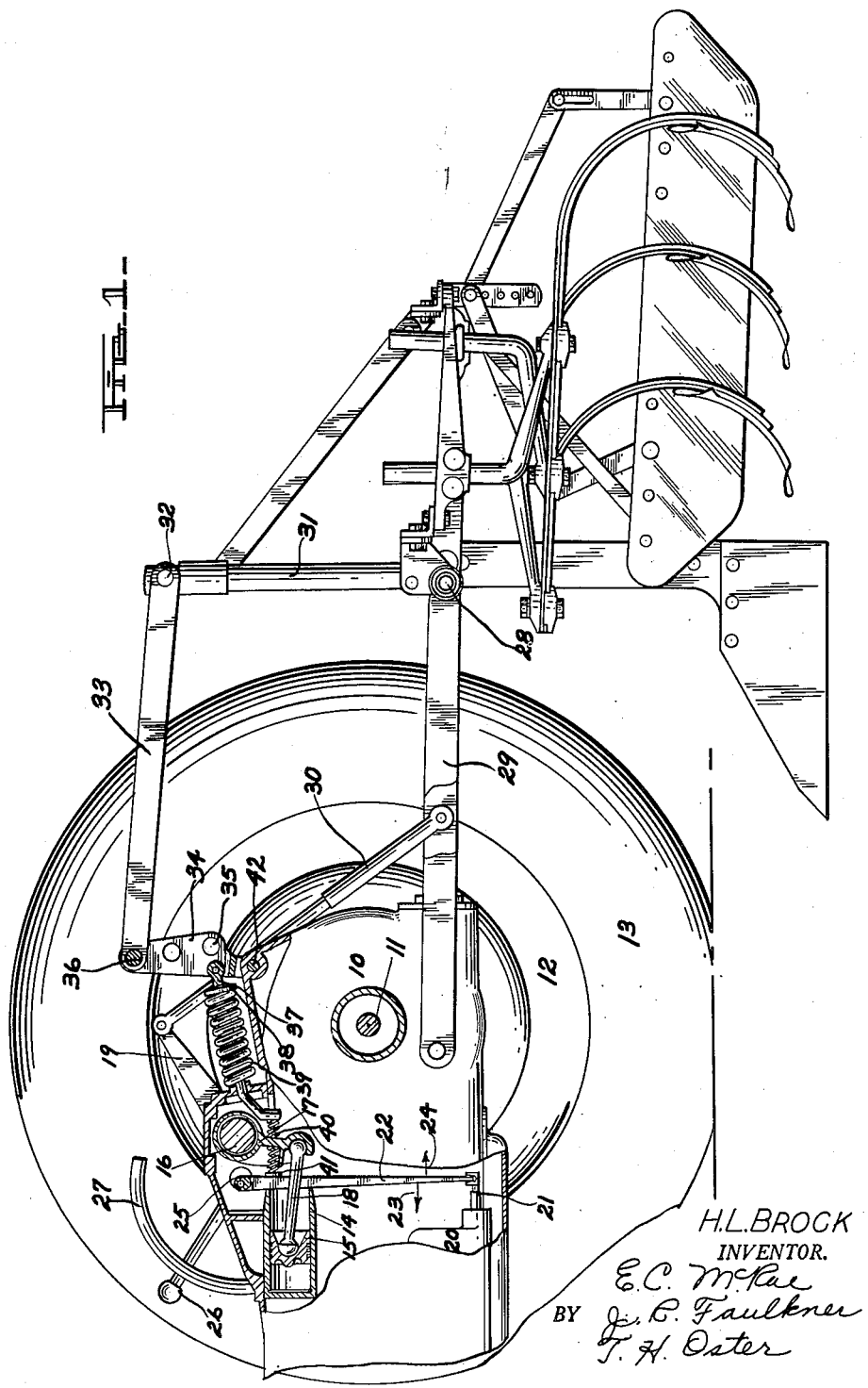
H. L. BROCK
INVENTOR.
BY E. C. McRae
J. C. Faulkner
T. H. Oster
ATTORNEYS Jan. 6, 1953  H. L. BROCK  2,624,257
FARM TRACTOR
Filed July 28, 1948  2 SHEETS—SHEET 2
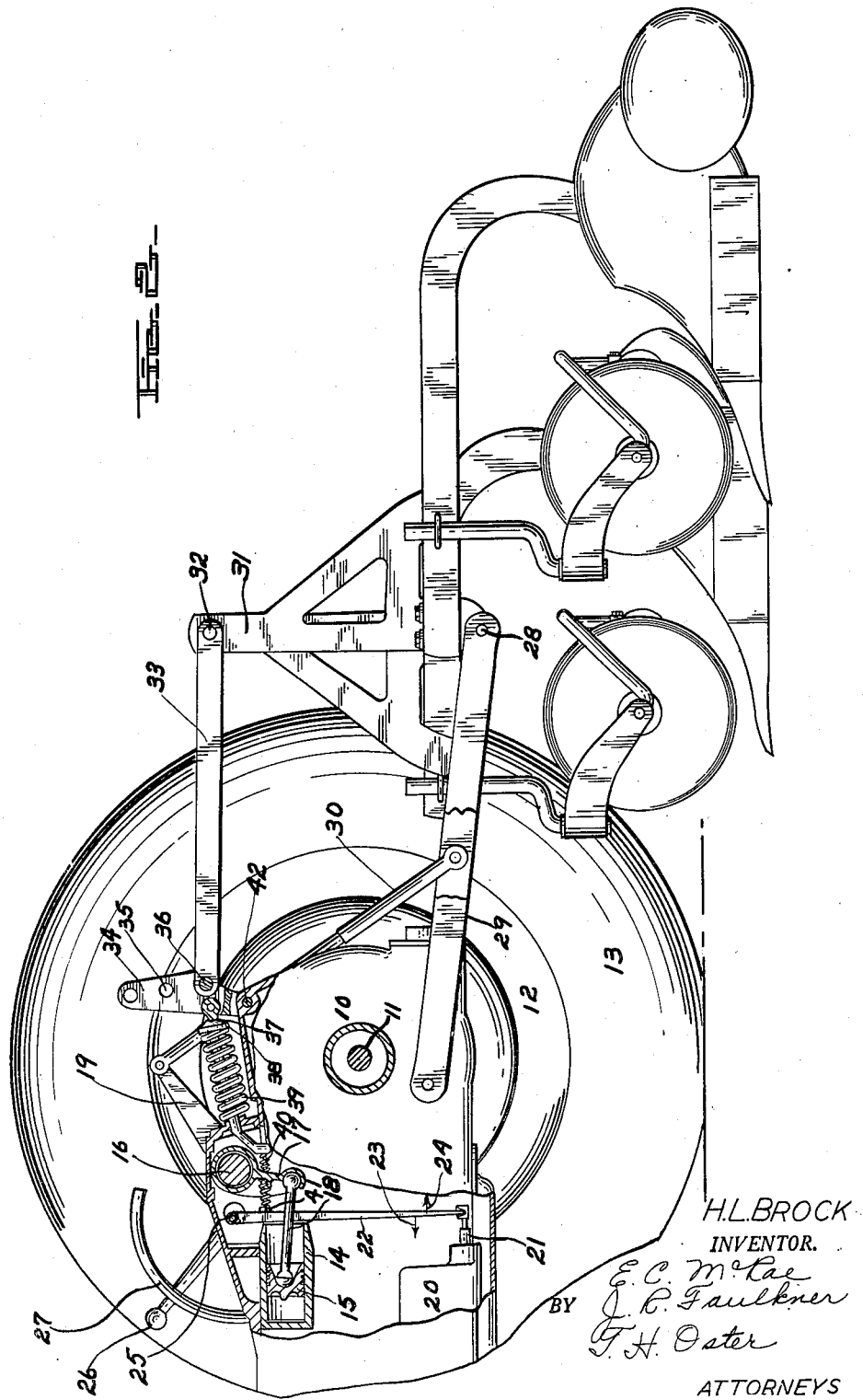
H. L. BROCK
INVENTOR.
BY E. C. McRae
J. R. Faulkner
F. H. Oster
ATTORNEYS Patented Jan. 6, 1953

2,624,257

UNITED STATES PATENT OFFICE 2,624,257

FARM TRACTOR

Harold L. Brock, Detroit, Mich., assignor to Ford Motor Company, Dearborn, Mich., a corporation of Delaware Application July 28, 1948, Serial No. 41,153

1 Claim. (Cl. 97—50)

The object of my invention is to provide improvements in a farm tractor to which a variety of implements may be alternately attached, which tractor is provided with an implement raising mechanism by means of which the implements may be operatively raised from or lowered to the ground. With this type of tractor the implement is carried rather than drawn and the depth that the implement penetrates the ground is controlled by the raising mechanism.

A further object of my invention is to provide improvements in a farm tractor having a series of implements attached thereto in such a manner that the draft or pull on the implement will control the implement lifting mechanism to raise the implement when the draft thereon exceeds a predetermined amount. This general arrangement of a tractor and draft controlled implement is shown in expired Patent 1,687,719. My improvement consists in means for more effectively controlling a wide variety of implements by the draft thereon.

A disadvantage heretofore encountered with all draft controlled implements known to the applicant is that the control mechanism was designed to operate only with implements having a relatively narrow range of draft requirements. That is, when the control unit was designed to effectively control an implement which normally required 800 pounds of draft, such unit was not satisfactory to control implements which normally required only 200 pounds of draft. This has been the principal disadvantage of draft controlled implements.

The object of this invention is to provide a control mechanism which will operate equally well with implements requiring a large or relatively small draft.

With these and other objects in view, the invention consists in the arrangement, construction and combination of the various parts of my improved control mechanism, as described in the accompanying specification, claimed in my claim and illustrated in the accompanying drawings, in which:

Figure 1 is a vertical, central, sectional view taken lengthwise through the rear portion of a tractor showing a light draft implement, in this case a spring tooth cultivator, attached to the rear of the tractor.

Figure 2 is a similar view through a tractor showing a heavy draft implement, in this case a two-bottom plow, attached thereto.

Referring to the accompanying drawings, I have used the reference numeral 10 to indicate the rear axle housing of a conventional tractor, which housing is provided with an axle shaft 11 extending therethrough, to the outer ends of which are attached rear wheels 12. Tires 13 are mounted on these wheels in the conventional manner. The mechanism for driving these wheels is not illustrated or described in the specification, as it forms no part of this invention and as the invention may be used with tractors employing any of the various types of drives available.

Mounted within the housing 10 I have provided a ram cylinder 14 in which a piston 15 is reciprocally inserted. A cross shaft 16 is rotatably mounted in the housing 10 just rearwardly of the cylinder 14 and an arm 17 is fixedly secured to the center portion of the cross shaft 16 and extends downwardly therefrom. A compression link 18 connects the piston 15 with the lower end of the arm 17. Thus when the piston 15 is forced rearwardly in the cylinder 14, the cross shaft 16 is rotated in a counterclockwise direction. Implement elevating arms 19 are fixed to the outer ends of the cross shaft 16 and, of course, rotate therewith.

A hydraulic pump 20 is mounted within the lower portion of the housing 10 and is actuated by the tractor engine so as to deliver oil under five or six hundred pounds pressure per square inch to the ram cylinder 14. The flow of oil to the ram cylinder is controlled by a reciprocating valve 21, which valve is actuated by a lever 22. This lever is pivotally mounted in a vertical position within the housing 10. Swinging movement of the lever in the direction shown by arrow 23 moves the valve 21 to open the discharge port of the pump thereby permitting oil under pressure to flow into the ram cylinder 14 and thus force the piston 15 outwardly to raise the arms 19. Movement of the lever 22 in the opposite direction, shown by arrow 24, permits the valve to move to a position where it shuts off the flow of oil from the pump 20 and opens an exhaust port from the ram cylinder 14 thereby permitting the piston to be moved back into the cylinder 14. A spring, not shown, constantly urges the valve 21 and lever 22 to move in the direction of arrow 24. When the arms 19 are supporting an implement, the weight thereof returns the piston when the exhaust port is opened.

The upper end of the lever 22 is pivotally mounted upon an eccentric crank 25 which is rotatably mounted crosswise through the upper portion of the housing 10. One end of the crank is secured to an operating handle 26. This handle is mounted to swing around a quadrant 27. When the handle 26 is in the position shown in the drawings, the upper end of the lever 22 has been moved about a half inch forwardly from its rearmost position. This movement of the lever operates through a mechanism, which will later be described, to permit the lower end of the lever to be moved by the valve 21 in the direction shown by arrow 24. The exhaust port from the cylinder 14 is thus opened to allow the lifting arm 19 to assume a lower or working position.

The tractor is adapted to have a number of different implements secured thereto, the implement shown in Figure 1 being a conventional spring tooth cultivator. This cultivator is provided with a pair of laterally spaced trunnions 28 which are connected to the tractor housing 10 by a pair of drawbars 29. The forward end of each drawbar is pivoted to the tractor and the rear end is, of course, pivoted to one of the trunnions 28. Thus, the implement as a whole may move up and down and swing laterally relative to the tractor. A raising link 30 is pivotally connected to the intermediate portion of each drawbar 29, which links extend upwardly to the adjacent arms 19 to which they are pivotally secured. Thus when the arms 19 are raised the drawbars 29 will be correspondigly raised to lift the implement.

A tower member 31 extends above each implement to support a pivot 32. A compression link 33 is pivotally secured to the pivot 32. The link 33 extends forwardly where it is secured by my improved mechanism to the tractor housing. This mechanism is arranged to actuate the control lever 22. The mechanism for accomplishing this function consists of a yoke 34 having its lowermost end pivotally secured by a pin 42 to the upper portion of the housing 10. The yoke extends upwardly from the housing and is provided with a plurality of vertically spaced openings 35 therethrough. A pin 36 may be selectively inserted in any of the openings 35. The openings 35 are so spaced that the forward end of the link 33 may be pivotally connected to the yoke by inserting the pin 36 through one of these openings and through the opening in the forward end of link 33. A control rod 37 is pivotally connected to the yoke 34 at a vertical position substantially in alignment with the lowermost opening 35. The rod 37 is provided with a shoulder 38 thereon which abuts a compression spring 39. Movement of the upper end of the yoke 34 forwardly relative to the tractor is thereby resisted by the spring 39. The rod 37 extends through the spring 39 and into the housing 10 where it is offset downwardly to avoid interference with the cross shaft 16. However, an extension 40 to the rod 37 projects forwardly to the lever 22 to form a fulcrum 41.

From the foregoing it will be seen that movement of the upper end of the yoke 34 forwardly against the resistance of the spring 37 moves the fulcrum point 41 in a forward direction to thus swing the lower end of the lever 22 forwardly around the crank 25. This moves the valve 21 inwardly to permit oil from the pump 20 to enter the ram cylinder 14 and raise the arm 19 to correspondingly raise the implement.

The plow, shown in Figure 2, is connected to the tractor with the same drawbars 29 and compression links 33 as are used to connect the cultivator and is likewise provided with a tower 31 which supports the rear end of the link 33.

The mechanism so far described, with the exception of the yoke 34, is not claimed as being part of this invention but is described to illustrate the functioning of the claimed device. It is apparent that when either the plow or cultivator are being operated in normal use, the draft on the implement is exerted by the drawbars 29. The resistance of the implement to forward movement is applied at or beneath the ground line and thus this resistance tends to tip the implement forwardly around the trunnions 28 to thus compress the link 33. Compressive force on the link 33 is resisted entirely by the spring 39. This spring must be quite stiff in order that a large draft may be resisted. Consequently, if a light draft only is to be resisted the spring will not be responsive. Of course, different springs could be used to suit the particular implement being drawn but the adjustment of these springs is quite critical and changing the spring would not be conducive to quick attachment and detachment of implements as is necessary in ordinary farming.

My improvement is the provision of the yoke 34 with vertically spaced openings 35 therein into which the forward end of link 33 may be selectively engaged. When the link 33 is engaged to the uppermost opening 35 a substantial three to one leverage is obtained on the spring 37 to actuate the control valve. When the forward end of the compression link 33 is placed in the intermediate opening 35 a two to one leverage is obtained on the spring 39. Likewise, when the forward end of the link 33 is secured in the lowermost opening 35 a one to one or no gain in leverage is provided. Thus, the spring 39 may be designed to resist a compressive force equivalent to the normal force developed in the operation of the heavy draft implements with the link 33 placed in the lowermost opening. If now a light draft implement is to be attached to the tractor, the link may be attached in one of the upper openings to multiply the draft force on the spring and correctly operate the control valve. For example, if a compressive force of 900 pounds results from the normal operation of a two-bottom plow, the spring 39 must be designed to resist this force, as otherwise the plow will be prematurely lifted out of the ground. If now a light draft implement such as a cultivator is attached to the tractor, the forward end of the link 33 may be inserted in the top opening 35 and a draft of only 300 pounds on the implement will produce a 900 pound compressive force on the spring to thereby keep the unit in balance.

The advantage of this construction is that a single predetermined compressing spring may be provided, which when used in combination with the yoke 34 will allow the correct operation of implements of widely varying draft requirements.

Some changes may be made in the arrangement, construction and combination of my structure without departing from the spirit of my invention and it is my intention to cover by my claim such changes as may reasonably be included in the scope thereof.

I claim as my invention:

In a farm tractor adapted to pull a ground engaging implement, a pair of drawbars connecting the implement to the tractor, a hydraulic lift for raising the attached implement relative to the tractor, a compression link extending between the implement and the tractor above the pair of drawbars, a yoke having its lower end pivotally connected to the tractor, said yoke normally extending substantially vertically upwardly from its pivotal connection to the tractor, a control rod for controlling the operation of said hydraulic lift, the rearward end of said control rod being pivotally connected to said yoke at a point spaced a predetermined distance above the pivotal connection of said yoke to said tractor, a compression coil spring surrounding said control rod and positioned between a fixed part of said tractor and a stop member provided on said control rod near the rearward end thereof, said yoke having an opening provided therein substantially in horizontal alignment with the pivotal connection between said control rod and said yoke so that attachment of the forward end of said compression link to said yoke at said opening enables the compressive force in the link to be applied in a 1-1 or direct ratio to the compression spring and the control rod, said yoke having a second opening therein spaced above said first-mentioned opening a distance substantially equal to the distance between the pivotal connections of said yoke to the tractor and to the control rod so that attachment of the compression link to the yoke at said second opening enables the force in the link to be applied in a 2-1 ratio, and said yoke also having a third opening therein spaced above said second opening a distance substantially equal to the distance between said first and second openings so that attachment of the compression link to the yoke at said third opening enables the force in said link to be applied in a 3-1 ratio.

HAROLD L. BROCK.

REFERENCES CITED

The following references are of record in the file of this patent:

UNITED STATES PATENTS

| Number | Name | Date |
|---|---|---|
| 2,099,637 | Wendel | Nov. 16, 1937 |
| 2,356,231 | Ferguson | Aug. 22, 1944 |
| 2,415,156 | Arps | Feb. 4, 1947 |
| 2,440,550 | Martin | Apr. 27, 1948 |
| 2,460,847 | Schwarz | Feb. 8, 1949 |
| 2,465,641 | Gardner | Mar. 29, 1949 |
| 2,515,637 | Dooley et al. | July 18, 1950 |